United States Patent [19]

Henry et al.

[11] Patent Number: 4,728,787
[45] Date of Patent: Mar. 1, 1988

[54] ALIGNMENT PROCESS FOR AN ELECTRO-OPTICAL DEVICE

[75] Inventors: Raymond Henry, Fontenay-aux-Roses; Jean C. Carballes, Gif-sur-Yvette; Eugène Duda, Villebon-sur-Yvette; Emmanuel Grard, Les Ulis, all of France

[73] Assignee: Thomson-CSF, Paris, France

[21] Appl. No.: 902,100

[22] Filed: Aug. 28, 1986

Related U.S. Application Data

[63] Continuation of Ser. No. 554,631, Nov. 23, 1983, abandoned.

[30] Foreign Application Priority Data

Nov. 30, 1982 [FR] France .................. 8220043

[51] Int. Cl.$^4$ .................................... H01J 5/16
[52] U.S. Cl. ............................ 250/227; 350/96.20
[58] Field of Search ........................ 350/96.20, 328; 250/227, 239; 427/54.1

[56] References Cited

U.S. PATENT DOCUMENTS

| | | | |
|---|---|---|---|
| 3,361,842 | 1/1968 | Applegath et al. | 260/837 |
| 4,357,072 | 11/1982 | Goodfellow | 350/96.20 |
| 4,443,494 | 4/1984 | Gonser | 427/54.1 X |

FOREIGN PATENT DOCUMENTS

| | | |
|---|---|---|
| 0021473 | 1/1981 | European Pat. Off. . |
| 2930317 | 2/1981 | Fed. Rep. of Germany . |
| 2372444 | 6/1978 | France . |
| 55-22709 | 2/1980 | Japan .................. 350/96.2 |
| 2026194 | 1/1980 | United Kingdom . |

OTHER PUBLICATIONS

Patents Abstracts of Japan, vol. 4, No. 51, Apr. 17, 1980 & JP-A- 55 22709 (Fujitsu K. K.) 18-02-1980.

Primary Examiner—John P. McIntosh

[57] ABSTRACT

A process of aligning electro-optical devices that associate a semiconductor, laser diode or electroluminescent component with an optical component, such as an optical fiber. These devices must be aligned with a precision of from ±1 to ±10μ. The semiconductor component is integral with a centering part through the intermediary of a first bracket. The optical component, through the intermediary of a second bracket, is integral with a container in which is placed a hardening material. The centering part is plunged in the hardening material, with three degrees of mobility. The alignment is dynamic. When adjustment has been made, the hardening material is rapidly and rigidly fixed.

5 Claims, 6 Drawing Figures

ALIGNMENT PROCESS FOR AN ELECTRO-OPTICAL DEVICE

This application is a continuation, of application Ser. No. 554,631, filed Nov. 23, 1983, now abandoned.

BACKGROUND OF THE INVENTION

1. Field of the Invention

The present invention concerns a process for the alignment of an electro-optical solid state device on an optical fiber, in order to obtain an optical head, i.e. an electro-optical component, that is an assembly contained in a sealed closed housing and acting as interface between an electronical part and an optical part. The process according to the invention is dynamic, i.e. the solid state device and the fiber operate during their respective positioning. The invention concerns optical heads aligned according to said invention.

An electro-optical component, called optical head, comprises inside a protective housing:
- in every case, a light emitting or receiving semiconductor chip, and a light line,
- in frequent case, feed-back and electronic elements such as feed or control elements or protection elements and possibly control electronics.

The semiconductive chip can be a laser diode, an electroluminescent DEL diode, a PIN diode, for example, for the reception. The light line comprises an optical fiber and often a focusing microoptic in the form for example of a lens at the end of the optical fiber. The feed-back elements included in the housing can be elements for controlling the emitted light, or the temperature, for example.

The electro-optical components suitable to be aligned according to the process described in the present invention are either receiving devices in which an optical fiber brings the light up to a photodiode or phototransistor, or emitting devices in which a DEL or a semiconductive laser emits light towards an optical fiber.

In both cases, the most difficult problem to overcome is that of optimizing an optical head, since the luminous powers involved are very weak—1 to 20 milliwatts maximum except for a pulsed operation—and the dimensions of the objects to be positioned very small—50/125 micrometer for an optical fiber and 40 to 200 micrometers for an electro-optical semiconductor (it concerns the sensitive surface)—with a precision of more or less 1 to 10 microns. A misalignment of 3 micrometers in the alignment of an optical fiber on a laser produces an energy loss of 1 decibel.

Adjusting and aligning means operated up until now use either a mechanical pre-adjusting, the optical fiber being positioned in a groove provided in the support of the semiconductive device, or a dynamic adjusting, during which a drop of a photopolymerisable glue, supported by the optical fiber, is suddenly solidified by a flash of ultraviolet light at the moment when the optical fiber is well positioned.

The process according to the invention operates an optical head housing divided into at least two metallic parts—without counting the annex movable parts such as a closing cover or a joining connector, for example. On a first part of the housing is fixed the electro-optical solid state device, and if necessary the associated electronics; on the other part is fixed the optical fiber. One of the two parts comprises means for containing molten solder, such as an annular groove, or two or three cups.

The other part comprises metallic means that plunge into the molten soldering bath. The length and the width of the molten soldering bath are sufficient to allow a free displacement of the first part of the housing with respect to the second part of the housing, along three orthogonal axes; this allows the adjusting of the optical fiber with respect to the semiconductor, during a dynamic positioning. When the optimal position of the fiber with respect to the semiconductor is reached, the soldering is cooled and solidified.

SUMMARY OF THE INVENTION

In a more precise way, the present invention concerns a process for the alignment of an electro-optical device, comprising:
 a solid state, light emitting or receiving component, fixed on a mechanical support;
 an optical light transmitter or receiver component, fixed on a mechanical support, independant from the first support, wherein, during a dynamic adjustment in operation, the relative optimal positions of the two components are rigidly fixed relative to each other by solidification of a hardening material into which is plunged a centring part integral with a first support, the volume of the hardening material, the container of which is integral with a second bracket, being sufficient to allow the centring piece to freely move along three different directions.

BRIEF DESCRIPTION OF THE DRAWINGS

The present invention will be better understood by reading through the following description which refers to the annexed drawings which represent.

DESCRIPTION OF THE PREFERRED EMBODIMENT

Figure 1:
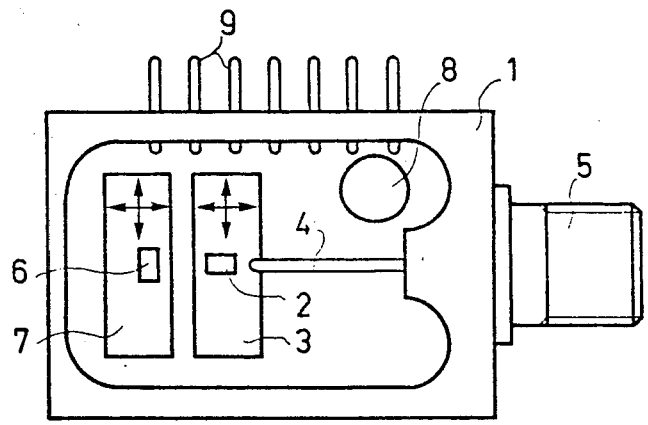
FIG. 1: front view of a laser optical head according to the prior art.

FIG. 1 represents a cross-section of an optical head according to the prior art, or more precisely an optical head in a housing, the cover of which has been removed.

This optical head is comprised of a metallic housing 1 inside which is fixed a laser semiconductor 2, supported by a part or bracket 3 that allows adjustment in two directions within the housing 1. Semiconductor 2 is aligned with respect to a position of optical fiber 4, that acts as interface between the inside of the housing and the outside of the housing, through the intermediary of the optical connector 5. The optical head also comprises a feed-back device 6, that is, for example a PIN diode, which controls the light emitted by the rear face of the semiconductor device 2. PIN diode 6 is also supported by a piece 7 that allows its adjustment in two directions within the housing. In certain cases, the optical head furthermore comprises a device 8, that is often a transistor, the junction of which acts as a thermometer for controlling the temperature within the housing of the optical head. External connections 9 supported by glass rings, cross the thickness of the wall of the housing and bring or extract the different signals necessary for the operating of the optical head.

A serious problem is alignment, or the adjustment of the light line 4 with respect to the semiconductor capsule 2. Different cases are possible.

If the optical head is a receiving head, the problem is less delicate since the diameter of fiber 4 is smaller than that of the sensitive surface of PIN diode 2, that receives the light by a principal face of the semiconductive crystal: 50 micrometers for the optical fiber, 60 to 200 micrometers for the diode. However, since the sensitive surface of the diode in the case of very high frequency signals is as small as possible in order to have only a small capacity, it is necessary in this case to position fiber 4 with respect to diode 2 with a precision of ±10 micrometers.

If the optical head is an emitting head provided with an electroluminescent diode, called a DEL diode, an adjustment precision of ±5 micrometers is necessary in order to optimize the alignment of a diode having a diameter of 50 micrometers with a fiber of the same diameter.

Furthermore, if the optical head is an emitting head provided with a laser diode—which is the case of FIG. 1—the diode emits the light through a band about 4 micrometers wide and 0.2 micrometer thick, this band being apparent on a lateral face of the semiconductor crystal. An alignment precision of ±1 micrometer is thus necessary.

It can thus be seen that it is necessary to obtain a positioning of the different components of an optical head to within more or less 1 micrometer accuracy, which from the mechanical point of view is already somewhat delicate, but which moreover is altered when the optical head operates, by reason of the different dilations due to heating of the components. This is why, the adjustment in the case of a laser being the most delicate and that which requires the highest precision, the following description of the invention will bear on the case of an electro-optical device that is a laser, without the invention being limited to this single case.

Figure 2:
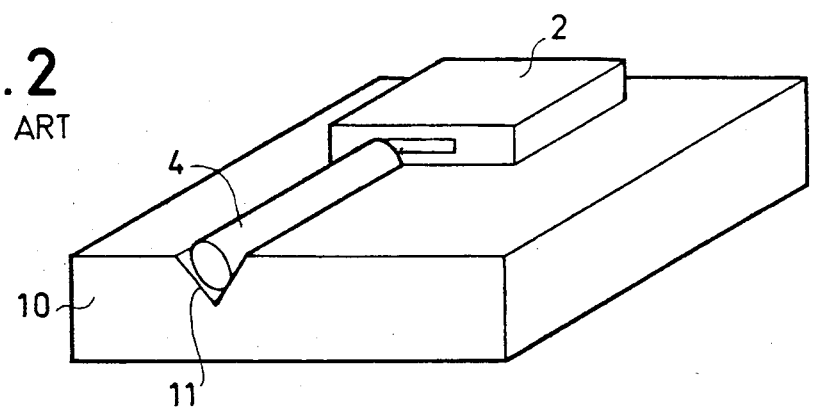
FIG. 2: three-fourths side view of a positioning device of the optical fiber with respect to a laser known per se.

FIG. 2 represents a positioning device of an optical fiber with respect to a laser, according to the prior art.

This device is reduced on the drawing to show only those pieces necessary for it to be understood.

According to this adjustment process, the chip of a laser 2 is supported by a part 10, onto which it is welded by the means, for example, of indium. The optical fiber 4 is supported by part 10, preferably made of silicon in which has been provided a V-shaped groove 11, by chemical means adapted to the chipping of silicon, and which allow to obtain a very high precision in the etching of a V-shaped groove 11. The laser and optical fiber 4 bracket is supported by a single base plate (not represented on the figure) and it is possible to move the laser chip 2 prior to indium welding along two axes in a horizontal plane on the surface of part 10, and after welding to displace the optical fiber 4 along an axis in a horizontal plane. When optical fiber 4 is well positioned with respect to the laser emitter tape, it is fixed by means of a drop of photopolymerizing glue, that is suddenly solidified through the intermediary of an ultraviolet light flash, for example.

This alignment process has the advantage of being simple since it is based on the purely mechanical alignment of two parts, the laser and the optical fiber, without it being necessary to cause them to operate together in order to optimise them. But on the other hand, it requires a very great precision in the handling of the parts, great reliability in the manufacture of the parts, especially the bracket part 10 with V-shaped groove 11, so that all these pieces are realised with a degree of precision better than the micrometer. This process has, on the contrary, the drawback of being somewhat expensive, since it requires that the parts be perfectly machined.

Figure 3:
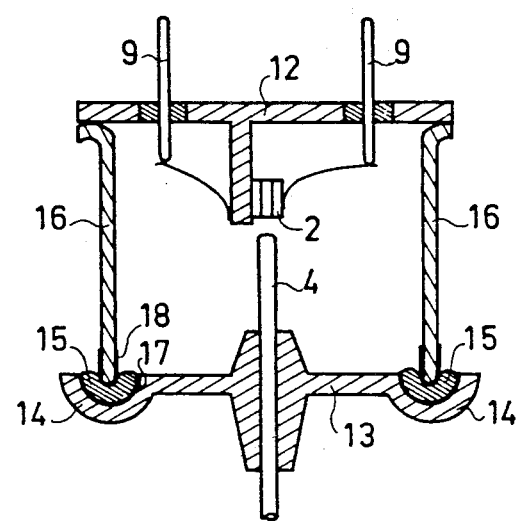
FIG. 3: section view of an optical head operating the process according to the present invention.

FIG. 3 represents an optical head operating the alignment process according to the invention. The structure of the optical head is adapted to such an operation, and it is notable that the process does not necessitate any considerable precision on the machining of the constituent parts.

The optical head is made of two principal parts. The first part is the bracket of the laser diode 2, made of a metallic piece 12, suitably constituted and provided with external connections 9, insulated by glass rings, for the supply of the laser diode. The second part is the bracket of the optical fiber 4, by means of a piece 13 having a suitable form.

Among the two main pieces or brackets 12 and 13, the one which in the present case is piece 13 that bears the optical fiber, comprises a groove forming a trough, which, according to the form of the housing is round or rectangular, this groove being filled with soldering material 15. The dimensions of the groove are sufficiently large to correspond to a free displacement along three axes of a reference trihedral of one piece with respect to the other within the limit of the strokes necessary for the alignment of the optical fiber on the laser. The other piece, that is therefore in the present case piece 12, comprises a metallic part 16 the lay-out of which corresponds to the lay-out of the trough 14, this metallic part 16 plunging into the soldering material 15, this metallic part will be herein-after referred to as centering piece.

The alignment process of the fiber with respect to the laser is thus the following. Piece 12, on which the laser chip 2 is welded, for example by indium, the melting temperature of which is $T_f = 156°$ C., is maintained fixed and possibly cooled in order to ensure improved operating of the laser. Piece 13, that bears the optical fiber, is on the contrary heated so that soldering 15 contained in trough 14 is brought to its melting point. Laser chip 2 being brought under polarization emits light, and a micromanipulation appliance, which is not represented on the figure since it lies outside the field of the present invention, displaces optical fiber 4 and its bracket 13 along three axes in the space until the optical fiber is in an optimal position with respect to the laser. In order to do this, the laser light, collected by the optical fiber inside the housing, is received and analysed outside the housing. Data collection electronics, that can comprise a microprocessor controlling the movements of bracket 13 with respect to bracket 12, optimizes these displacements and stops them when the light received at the external end of fiber 4 is optimal. When the dynamic adjustment has obtained the optimization of the laser-fiber coupling, the bracket 13 is cooled and soldering 15 that was in molten state rigidly fixes, thus fixing the relative positions of laser bracket 12 with respect to fiber bracket 13.

The heating of soldering 15 can be obtained by a heating coil, or by a piece heated and maintained in contact with the trough 14 that contains the soldering, or yet by the passage of an electric current in two pieces made of resistant material such as graphite, these two pieces gripping the trough.

The fact that the adjustment is made dynamically and that the data collection is realized by improved means such as microprocessors, for example, allow to take into account the temperature at which the different parts 12, 13 and 16 are brought, and to fix the base plate of the fiber with respect to the base plate of the laser by taking into account the real dilatations during this alignment, with respect to the dilatations that will occur during normal operation of the optical head. In this way, the parts are preferably rotation pieces, since at the return to ambient temperature there is no adjustment modification in the plane of bracket 13 since the part is a rotation piece. On the contrary, it is possible to take into consideration along the axis of the optical fiber or, which turns out to be the same, along an axis perpendicular to this bracket or base plate, the slight dilatation $\Delta Z$ of the soldering 15 obtained between melting point and ambient temperature (25° C.).

The displacement of the objects between themselves, i.e. bracket 12 with respect to bracket 13, are very small, only a few hundred micrometers if it is necessary to obtain an adjustment to within one micrometer accuracy. But furthermore the solderings classically used have a tendency to wet certain metals, and in order to better localize the soldering in the trough 14 and at the end of part 16, without the solder wetting too much these parts, it is prudent to locally gild the ends of the opposite facing parts. On FIG. 3 trough 14 is gilded inside on one surface 17 whereas the end of part 16 is gilded on a surface 18, the opposite facing pieces 17 and 18 being only wetted by the solder.

The solder used is preferably a tin alloy called soft solder such as Sn-Pb-Ag or Sn-In-Ag or again even simply Pb-In, so that the melting point of the solder is fairly low and is preferably comprised between 120° and 200° C. This low melting point is necessary in order not to heat too much the optical fiber, or on the other hand, the laser capsule 2 which is fixed on its bracket 12 by indium the melting point of which is 156° C.

Or again it is possible to replace the solder by a thermohardening resin or more exactly by a resin which is polymerizing under the effect of a radiation such as an ultraviolet ray or X-ray radiation. In this case, the trough 14 is filled with polymerizing resin, the dynamic adjustment of the optical fibre with respect to the laser is operated and when optimum is reached an ultraviolet flash or an X-ray emission suddenly polymerizes in a time comprised between 1 and 5 seconds maximum, the resin that is present in the trough and thus fixes the two parts with respect to each other. However, the use of metal-based solders is preferable since it is more adapted to ensure a durable sealing and the solder has a smaller dilation coefficient than the polymerizing resins.

FIG. 3 represents the case of an optical head that once the fiber and the laser are aligned, is completely sealed. However, in certain cases, it is preferable to align the fiber and the laser, thereafter to be able to intervene for an electric adjustment, for example on the electronics that are found inside the housing: in this case, it is preferable to operate in two periods, first of all to align the optical components, then to close in a sealed manner the mechanical setting up. This is represented in FIG. 4.

Figure 4:
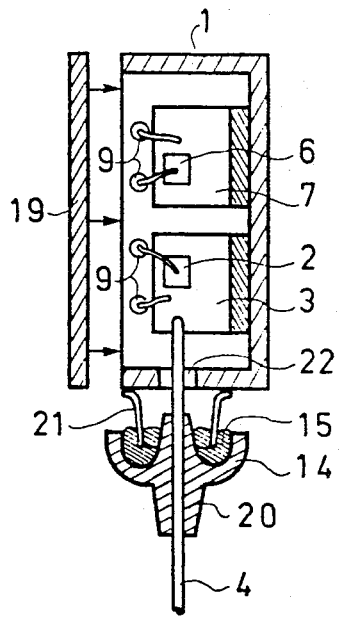
FIG. 4: optical head operating the process according to the invention in a second embodiment.

FIG. 4 further represents the optical head of FIG. 1 according to the prior art, but instead of the adjustment of the fiber with respect to the laser being made by a mechanical displacement of bracket 3 of the laser on the bottom of the housing 1, the adjustment is made in the case of FIG. 4 according to the process of the present invention.

The optical head thus comprises, inside metallic housing 1 and its cover 19, which on this figure is not yet fixed on the bottom of the housing 1, on the one hand, a laser diode 2 supported by a metallic part and, on the other hand, a control diode supported by a metallic part 7. These two diodes are fed by external connections 9.

Furthermore, optical fibre 4 is fixed, by a resin for example, or preferably a soldering inside a part 20 that comprises a trough 14 into which will be carried forward, at the given moment, solder 15. The housing 1 comprises the laser 2 and the part 20 supporting the fiber 4 are aligned with respect to each other by means of a centring part 21 that is fixed inside housing 1, in such a position that the optical fiber is in the axis of the luminous beam emitted by the laser 2. This part 2 can have a square section, but, as stated herein-above, it is preferable that it have a circular section. Furthermore, of course, an orifice 22 provided in the housing 1 allows the optical fiber to through cross this housing to approach the laser 2.

The adjustment and the alignment of the optical fiber 4 with respect to the laser 2 is carried out in the same manner as in the case of FIG. 3. This means that the solder 15 being brought to a temperature above its melting point, and the housing 1 being cooled in order to prevent the laser from working at above 70° C., the dynamic adjustment allows to displace the part 20 along three axes orthogonal with respect to the housing, i.e. with respect to the laser. When the optimum adjustment is reached, the solder 15 contained in the trough 14 is cooled and the fiber is found to be aligned with the laser.

It has been presumed on FIG. 4 that the fiber 4 is an intermediary fiber of about 1 to 2 m long, that connects inside an electronic system between the optical head and another component. However, the optical head can comprise, as was the case with FIG. 1, an outlet by means of an optical connector.

Figure 5:
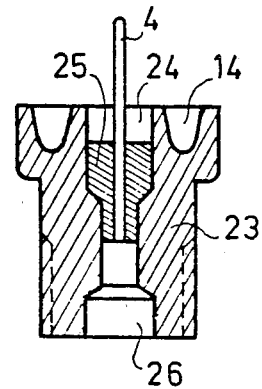
FIG. 5: a connector for optical fibers adapted to the processes according to the present invention.

FIG. 5 represents a connector for optical fibers adapted to the alignment process according to the invention. This connector essentially comprises a threaded metallic body 22 inside which is bored a housing 24. In this housing 24, is placed the tip 25 of an optical fiber 4: this type of tip is known per se and consists of a light metal sleeve inside which the optical fiber 4 is blocked by a thermohardening resin. A second optical fiber comprising an identical tip will take up position in the housing 26 which inside body 23 of the connector, is aligned with the housing 24.

The peculiarity of this connector for optical fibers is that it comprises a trough 14, on its face opposite the housing of the optical head, this trough 14 being destined to be, at the appropriate moment, filled with solder 15.

Centering and alignment means that were mentioned herein-above are constituted by a single trough 14 filled with molten solder and by a single metallic part 16 on FIG. 3 or 21 on FIG. 4, the single metallic part being dipped inside the solder contained in the single trough.

Figure 6:
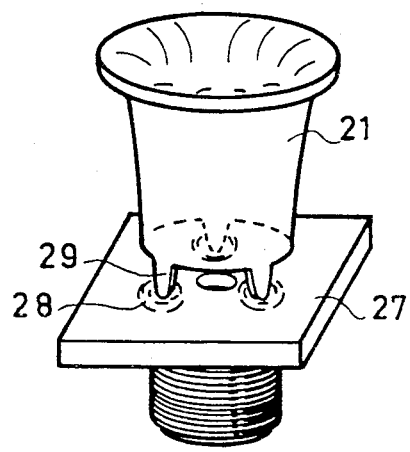
FIG. 6: a variant of the process according to the invention, corresponding to the embodiment represented in FIG. 4.

Unicity of these means is not compulsory and FIG. 6 gives an example of a variant of the alignment process according to the invention.

FIG. 6 takes up a detail of FIG. 4, and corresponds to the assembly of part 20 and of centring part 21. But whereas piece 20 comprised on FIG. 4 a single trough 14, the part 27 that can be an optical connector comprises on FIG. 6 a plurality of cups inside of which plunge lugs 29 borne by part 21. The cups 28 are filled with solder brought to fusion for the alignment operation. There can be two cups 28 and two corresponding lugs 29, but this type of fixation can give rise to a certain rotation of the connector 27 with respect to the housing and this is the reason why it is preferable to have a minimum of three cups 28 and three corresponding lugs 29 so that the housing and the connector are fixed without any rotation being possible between each other. When the centring part 21 is perfectly centred with respect to the connector 27, the sealing of the housing of the optical head may be achieved by completing the welding between the two parts 21 and 27 by means of a second welding, the melting point of which is lower than that of the solder that fills the cups 28 in such a manner as to prevent a further fusion and a decentring. The sealing operation can also be carried out by means of a glue seam.

The alignment process of an optical fiber with respect to an electro-optical semiconductor device, according to the invention, thus allows to realize perfectly aligned optical heads from mechanical parts and components that are not made up with very great precision. All the precision of the alignment resides in the dynamic adjustment appliance that collects the light transmitted by the optical fiber, and it also resides in the micromanipulator that displaces one of the parts with respect to the other. The process according to the invention thus constitutes an appreciable saving over the cost price of an optical head since if the dynamic adjustment is not diminished with time, and corresponds to other types of dynamic adjustment with other types of optical heads, at least the parts do not need to be machined with great precision, which is always an appreciable factor from the industrial point of view. Furthermore, the dynamic adjustment is easily automated.

The present invention has been described with reference to the case of an optical fiber and a laser diode but, as stated hereinabove, it concerns in a more general way, the alignment of an optical electronic component, i.e. either light emitter or light receiver, and an optical component that is more particularly an optical fiber but could be another device on a scale smaller than that of the optical fibers. The invention is specified by the following claims.

We claim:

1. A process for aligning an electro-optical device having a semiconductor light emitting or light receiving component and a light transmission component, comprising:

fixing the light emitting or light receiving component to a first mechanical support;

fixing the light transmitting component to a second mechanical support that is separate and independent from the first mechanical support;

fixing a centering element at a top end thereof to the bottom of the first mechanical support;

providing the centering element with three spaced-apart support lugs that extend outwardly from the bottom of the centering element;

providing the top of the second mechanical support with three cups which are spaced apart from each other a distance corresponding to the spacing between the three lugs on the centering element so that each of such lugs can be received in one of the cups, sizing each of the cups to be larger than the lugs so that the lugs can be moved in at least three orthogonal directions within the cups;

sizing the lugs so that they extend outwardly from the bottom of the centering element a distance sufficient to space the bottom of the centering element from the top of the second mechanical support so the centering element can be freely moved with respect to the second mechanical support in at least three orthogonal directions while the first mechanical support and the centering element remain supported by the lugs on the second mechanical support;

filling each of the cups with a polymeric hardenable material;

causing the polymeric hardenable material to assume a fluid state;

placing the centering element on the second mechanical support with each of the lugs located in one of the filled cups;

movably supporting the centering element and the first mechanical support on the second mechanical support via the lugs;

dynamically adjusting the position of the light emitting or light receiving component with respect to the light transmitting component by moving the centering element and the first mechanical support with respect to the second mechanical support while maintaining the lugs in the fluid material in the cups until the relative position of the light emitting or light receiving component with respect to the light transmitting component is optimum; and solidifying the material in the cups about the lugs to rigidly fix the lugs to the second mechanical component and to thereby rigidly fix the light emitting or light receiving component and the light transmitting component in the optimum position relative to each other.

2. A process according to claim 1, in which the polymeric material may be photohardened by UV flash or by ionising radiation.

3. A process according to claim 1, in which the centering element is integral with the semiconductor component, and in which the lugs are integral with the light transmitting component.

4. A process according to claim 1, in which the centering element is integral with the light transmitting component, and the lugs are integral with the semiconductor component.

5. A process according to claim 1, in which the light transmitting component is an optical fiber.

* * * * *